(12) United States Patent
Chen et al.

(10) Patent No.: US 9,243,698 B2
(45) Date of Patent: Jan. 26, 2016

(54) GEAR DRIVE SYSTEM WITH ADJUSTING STRUCTURE

(71) Applicant: Zhongshan Innocloud Intellectual Property Services Co., Ltd., Zongshan (CN)

(72) Inventors: Ping-Yi Chen, New Taipei (TW); Yao-Sheng Wu, New Taipei (TW)

(73) Assignee: Zhongshan Innocloud Intellectual Property Services Co., Ltd., Zhongshan (CN)

(*) Notice: Subject to any disclaimer, the term of this patent is extended or adjusted under 35 U.S.C. 154(b) by 341 days.

(21) Appl. No.: 13/906,723

(22) Filed: May 31, 2013

(65) Prior Publication Data

US 2014/0013883 A1 Jan. 16, 2014

(30) Foreign Application Priority Data

Jul. 11, 2012 (TW) .................................. 101124984

(51) Int. Cl.
*F16H 19/04* (2006.01)
*F16H 55/28* (2006.01)
*F16H 35/06* (2006.01)

(52) U.S. Cl.
CPC ................ *F16H 35/06* (2013.01); *F16H 19/04* (2013.01); *F16H 2019/046* (2013.01); *Y10T 74/19516* (2015.01)

(58) Field of Classification Search
CPC ... H04N 1/103; F16H 2019/046; F16H 19/04; F16H 35/06; F16H 55/26
USPC .................................. 74/422, 395, 396, 89.17
See application file for complete search history.

(56) References Cited

U.S. PATENT DOCUMENTS

| 303,110 | A | * | 8/1884 | Bodine | F16H 27/08 74/435 |
| 674,447 | A | * | 5/1901 | Mase | F16H 55/283 74/422 |
| 792,964 | A | * | 6/1905 | Cahen | F16H 55/18 74/440 |
| 2,410,643 | A | * | 11/1946 | Fielding | F16H 55/26 74/422 |
| 3,589,205 | A | * | 6/1971 | Radovic | B16C 11/02 105/127 |
| 3,805,634 | A | * | 4/1974 | White | B62D 5/24 74/441 |
| 5,582,070 | A | * | 12/1996 | Dominguez | F16H 19/04 192/143 |
| 6,227,065 | B1 | * | 5/2001 | Petersen | F16H 19/04 384/295 |
| 2014/0060225 | A1 | * | 3/2014 | Lee | F16H 19/04 74/89.17 |

FOREIGN PATENT DOCUMENTS

GB 436082 A * 9/1935 .............. F16H 19/04

* cited by examiner

*Primary Examiner* — William Kelleher
*Assistant Examiner* — Emily Cheng
(74) *Attorney, Agent, or Firm* — Novak Druce Connolly Bove + Quigg LLP

(57) ABSTRACT

A gear drive system includes a securing panel, a first slave gear, a drive gear, and an adjusting structure. The securing panel includes a panel body, a rack, and a rotating shaft. An upper part of the first slave gear is adjacent to the rack and aligned with the rack. The drive gear engages the first slave gear. The adjusting structure includes an elastic element, a slave element pivotally mounted to the panel body, and a third slave gear. The third slave gear defines a rotating hole. The rotating shaft is received in the rotating hole. The second slave gear is movable related to the panel body to enable the rotating shaft to be located in different positions of the rotating hole. The third slave gear is driven to move and rotate. The slave element is driven to rotate to press the elastic element.

16 Claims, 5 Drawing Sheets

GEAR DRIVE SYSTEM WITH ADJUSTING STRUCTURE

BACKGROUND

1. Technical Field

The present disclosure relates to gear drive systems, particularly to a gear drive system with an adjusting structure.

2. Description of Related Art

A traditional scanner includes a gear drive system. The gear drive system includes a drive gear, a first slave gear, a rack, and a second slave gear. The first slave gear is aligned with the rack. The drive gear is rotated by a motor to move the first slave gear along the rack. The slave gear engages the third slave gear to stop rotation during the process. When the drive gear rotates to engage the slave gear, the drive gear may be blocked from rotating when the teeth pitches of the rack and the slave gear do not match with each other.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
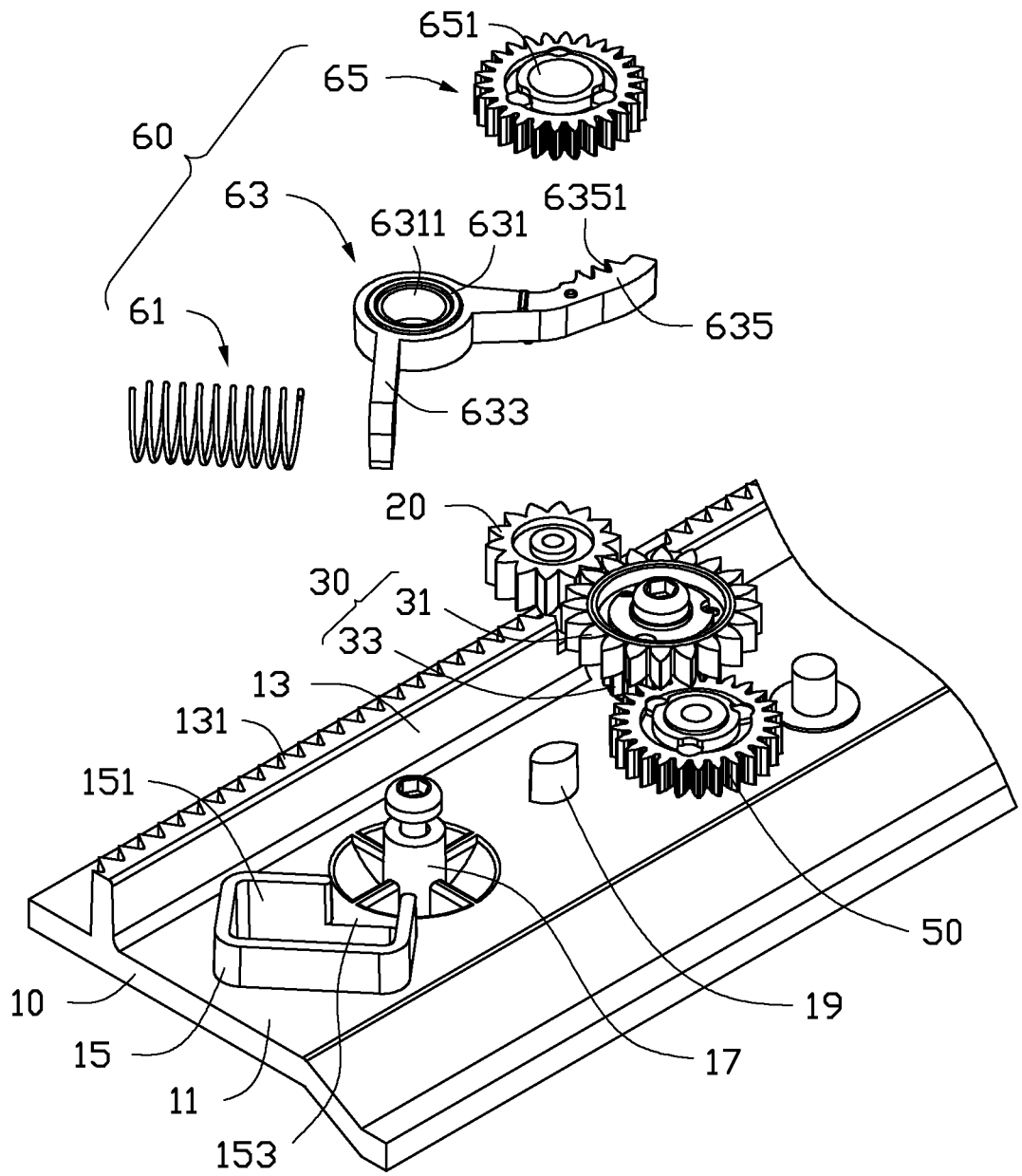
FIG. 1 is an exploded, isometric view of a gear drive system in accordance with one embodiment of the present disclosure.

FIG. 1 shows a gear drive system in accordance with one embodiment. The gear drive system includes a securing panel 10, a drive gear 20, a first slave gear 30, a second slave gear 50, and an adjusting structure 60.

The securing panel 10 includes a panel body 11, a rack 13, a receiving portion 15, a pivot shaft 17, and a rotating shaft 19. The rack 13, the receiving portion 15, the pivot shaft 17, and the rotating shaft 19 extend from the panel body 11. The receiving portion 15, the pivot shaft 17, and the rotating shaft 19 are below the rack 13 (shown in FIG. 3). The receiving portion 15 defines a receiving space 151 and a cutout 153, and the cutout 153 communicates with the receiving space 151. The cross section of the rotating shaft 19 is substantially eye-shaped. The rack 13 comprises a row of associating teeth 131 for engage the drive gear 20.

The adjusting structure 60 includes an elastic element 61 received in the receiving space 151, a slave element 63, and a third slave gear 65. The slave element 63 includes a pivot body 631, a pressing arm 633 extending from the pivot body 631, and an engaging arm 635 extending from the pivot body 631. The pivot body 631 defines a pivot hole 6311 corresponding to the pivot shaft 17. The engaging arm 635 defines a plurality of engaging teeth 6351 for engaging the third slave gear 65. The pressing arm 633 is used for being received in the receiving space 151 via the cutout 153 to resist the elastic element 61. In one embodiment, the elastic element 61 is a spring. The third slave gear 65 defines a rotating hole 651. The rotating hole 651 is circular. The rotating hole 651 is used for receiving the rotating shaft 19, and when the third slave gear 65 is moved along the panel body 11, the rotating shaft is moved in the rotating hole 651 relative to the third slave gear 65 (see FIGS. 3-5).

The first slave gear 30 includes a first gear portion 31 and a second gear portion 33. The first gear portion 31 and the second gear portion 33 are coaxial. The second gear portion 33 engages the second slave gear 50. The first slave gear 30 and the second slave gear 50 are both pivotally mounted to the panel body 11. The upper portion of the first gear portion 31 is aligned with the rack 13.

Figure 2:
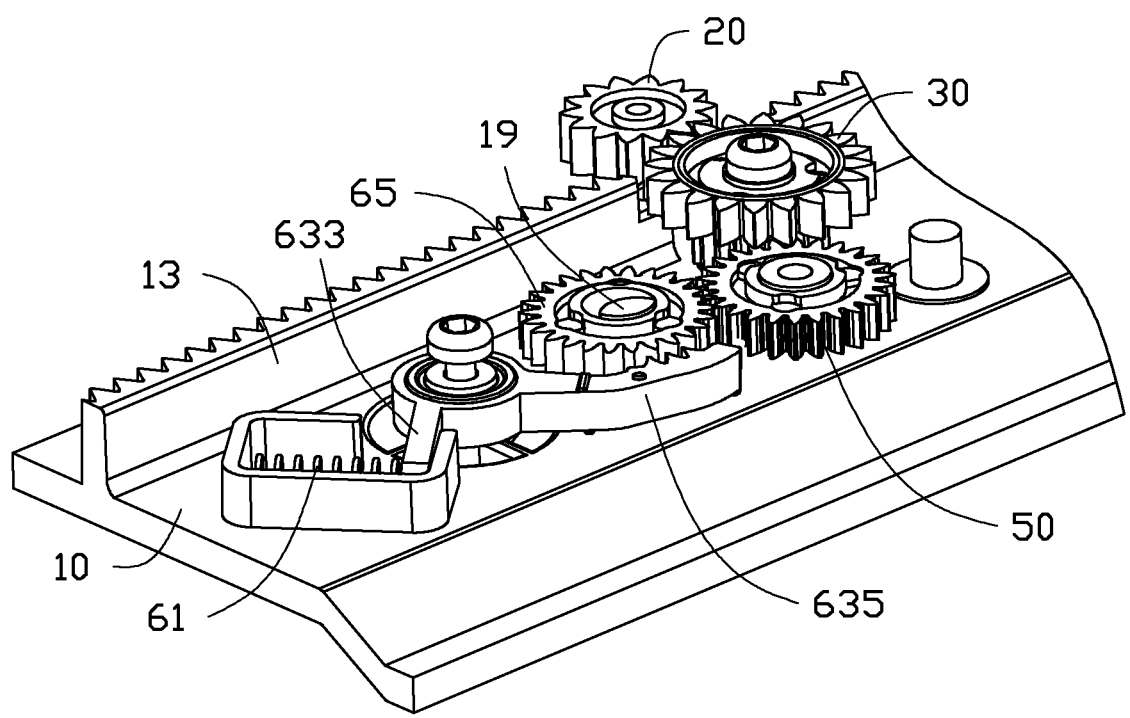
FIG. 2 is an assembled view of the gear drive system of FIG. 1.
Figure 3:
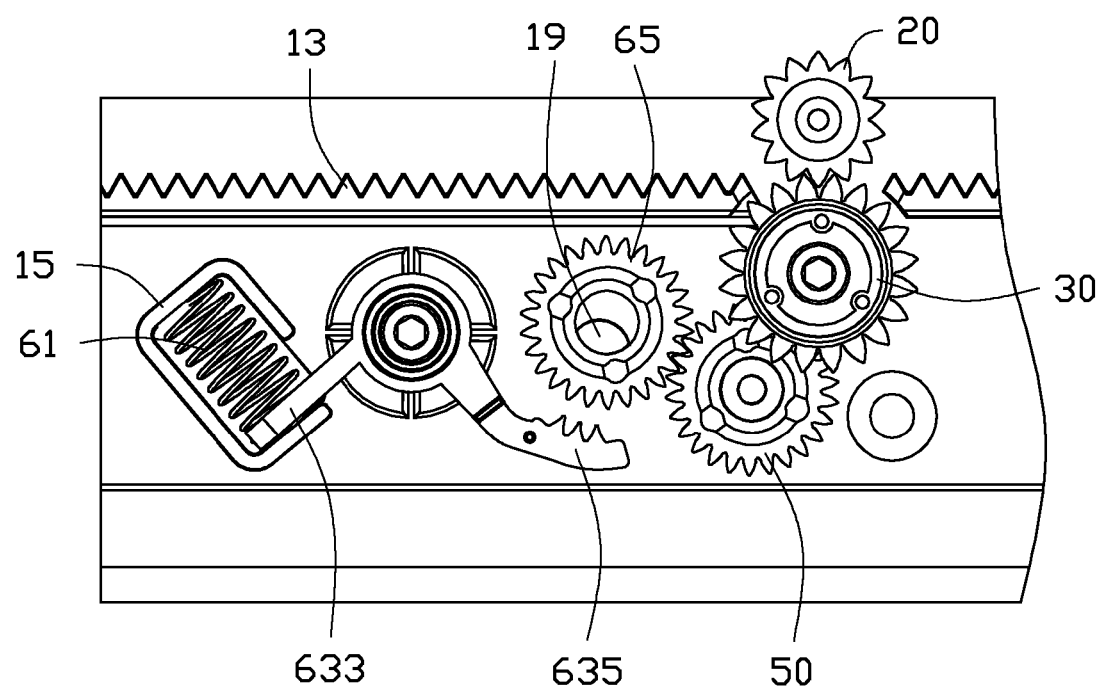
FIG. 3 is similar to FIG. 2, but viewed from another aspect.

FIGS. 2 and 3 show that in assembly, the elastic element 61 is placed in the receiving space 151 of the receiving portion 15. The pivot shaft 17 is received in the pivot hole 6311 of the slave element 63 and the pressing arm 633 is received in the receiving space 151 via the cutout 153 to contact the elastic element 61. The rotating shaft 19 is received in the rotating hole 651 of the third slave gear 65 to engage the third slave gear 65 with the second slave gear 50 and the engaging teeth 6351 of the slave element 63. The rotating shaft 19 is located in the lower part of the rotating hole 651 due to the support of the engaging arm 635. The drive gear 20 engages the first gear portion 31 of the first slave gear 30.

Figure 4:
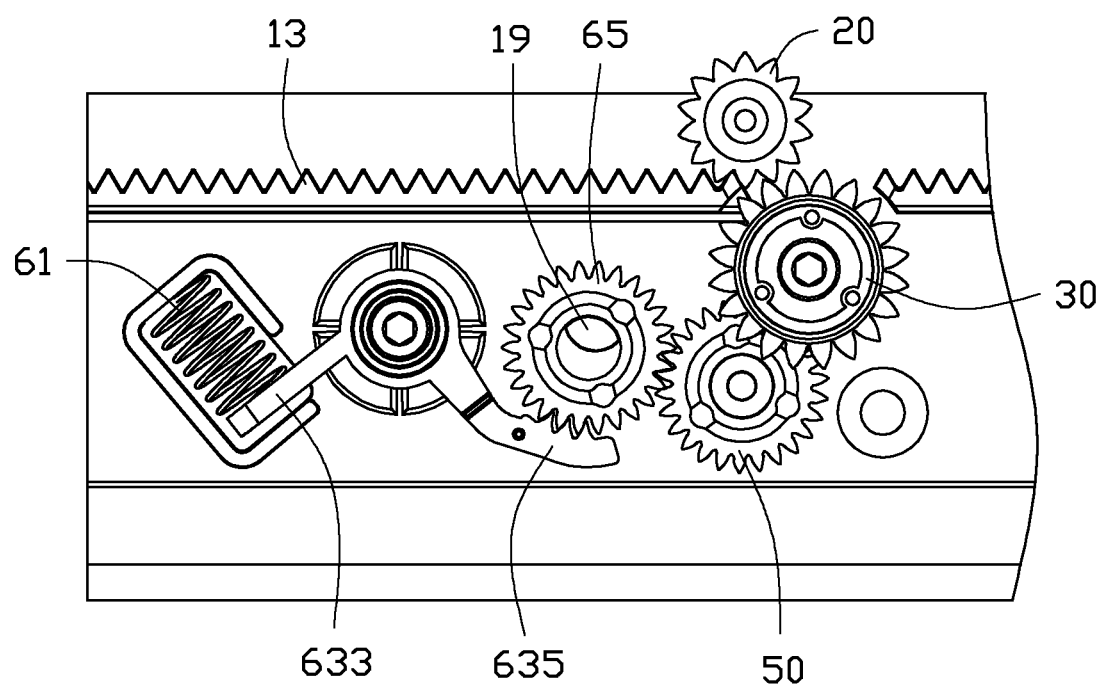
FIG. 4 is another assembled view of the gear drive system of FIG. 1, and shows the drive gear rotating on the first slave gear.

FIG. 4 shows that in use, a motor (not shown) rotates the drive gear 20 along a counterclockwise direction. The first slave gear 30 creates a force along the clockwise direction to be applied to the third slave gear 65. The third slave gear 65 is driven by the force to move down and rotate, thereby driving the first slave gear 30 to rotate. At this time, the slave element 63 is driven by the third slave gear 65 to rotate along a clockwise direction and the rotating shaft 19 is located in the upper part of the rotating hole 651. Thereby the pressing arm 633 presses the elastic element 61. Thus, the drive gear 20 can easily rotate from the first slave gear 30 to the rack 13 due to the rotation of the first slave gear 30, no matter whether the teeth pitches of the first slave gear 30 and the rack 13 matches with each other.

Figure 5:
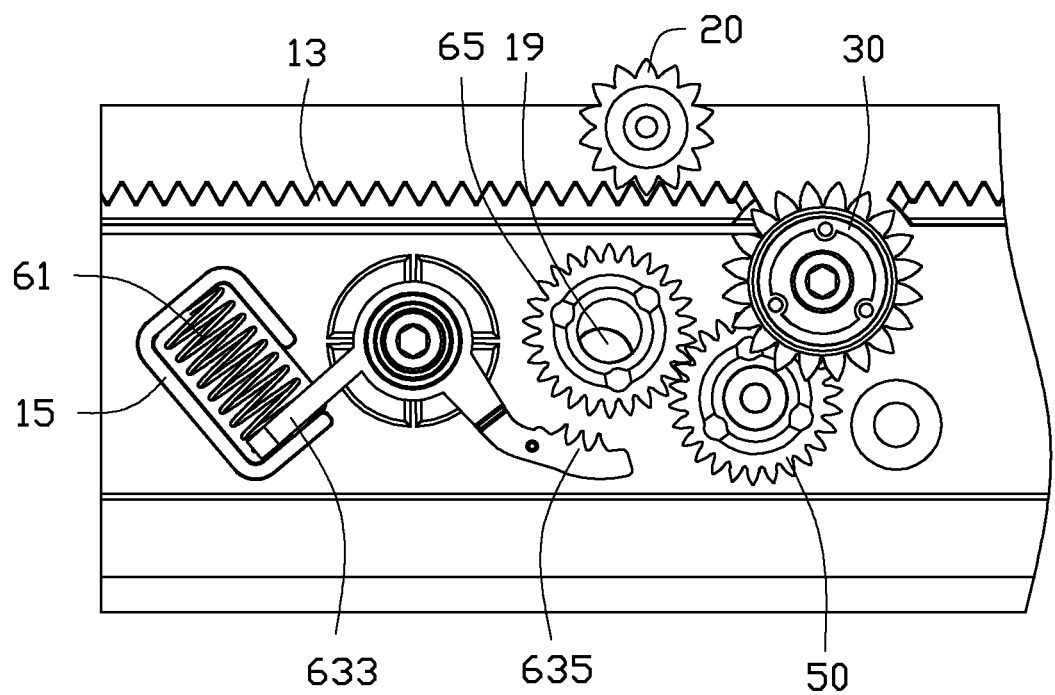
FIG. 5 is similar to FIG. 4, the drive gear rotating on the rack.

FIG. 5 shows that when the drive gear 20 rotates to engage the rack 13, the elastic element 61 rebounds to drive the third slave gear 65 to move up and rotate along a counterclockwise direction, thereby the third slave gear 65 moves back to the original position.

In one embodiment, the third slave gear 65 engages the first slave gear 30 directly. The second slave gear 50 is not needed. The engaging arm 635 of the adjusting structure 60 is located above the third slave gear 65.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A gear drive system, comprising:
a securing panel, the securing panel comprises a panel body, a rack extending from the panel body, and a rotating shaft extending from the panel body;
a first slave gear, an upper part of the first slave gear is adjacent to the rack and aligned with the rack;
a drive gear, the drive gear engages the first slave gear; and
an adjusting structure, the adjusting structure comprises an elastic element mounted to the securing panel, a slave element pivotally mounted to the panel body, and a second slave gear; the second slave gear defines a rotating hole; the rotating shaft is received in the rotating hole; the second slave gear is movable relative to the panel body to enable the rotating shaft to be located in different positions of the rotating hole; the second slave gear is configured to be driven by the first slave gear to move relative to the panel body and rotate when the drive gear rotates from the first slave gear to the rack; and the slave element is configured to be driven by the second slave gear to rotate to press the elastic element when the second slave gear rotates.

2. The gear drive system of claim 1, wherein the slave element comprises a pivot body pivotally mounted to the panel body, a pressing arm extending from the pivot body, and an engaging arm extending from the pivot body; the engaging arm engages the second slave gear; and the pressing arm is configured to press the elastic element when the second slave gear rotates.

3. The gear drive system of claim 2, wherein the securing panel further comprises a receiving portion extending from the panel body, and the receiving portion defines a receiving space receiving the elastic element.

4. The gear drive system of claim 3, wherein the receiving portion further defines a cutout communicated with the receiving space, and the pressing arm is configured to extend in the receiving space via the cutout to press the elastic element.

5. The gear drive system of claim 2, further comprising a third slave gear, wherein the third slave gear engages the first slave gear and the second slave gear.

6. The gear drive system of claim 5, wherein the first slave gear comprises a first gear portion and a second gear portion with the same axis as the first gear portion; the first gear portion engages the drive gear; and the second gear portion engages the third slave gear.

7. The gear drive system of claim 1, wherein a cross section of the rotating shaft is eye-shaped.

8. The gear drive system of claim 7, wherein the rotating hole is circular.

9. The gear drive system of claim 1, wherein the elastic element is configured to rebound to drive the second slave gear to move to an original position when the drive gear moves on the rack.

10. A gear drive system, comprising:
a securing panel, the securing panel comprising a panel body, a rack extending from the panel body, and a rotating shaft extending from the panel body;
a drive gear, the drive gear engages the rack;
a first slave gear, an upper part of the first slave gear is adjacent to the rack and aligned with the rack;
a third slave gear, the third slave gear is located under the rack and engages the first slave gear;
an adjusting structure, the adjusting structure comprising an elastic element mounted to the securing panel, a slave element pivotally mounted to the panel body, and a second slave gear; the second slave gear defines a rotating hole; the rotating shaft is received in the rotating hole; the second slave gear is movable relative to the panel body to enable the rotating shaft to be located in different positions of the rotating hole; the slave element comprising a pivot body pivotally mounted to the panel body, a pressing arm extending from the pivot body, and an engaging arm extending from the pivot body; the engaging arm engages the second slave gear; the second slave gear engages the third slave gear; when the drive gear rotates on the first slave gear, the second slave gear is configured to be driven by the third slave gear to rotate along a first rotation direction and move relative to the panel body to drive the engaging arm to move, thereby driving the pressing arm to press the elastic element.

11. The gear drive system of claim 10, wherein the securing panel further comprises a receiving portion extending from the panel body, and the receiving portion defines a receiving space receiving the elastic element.

12. The gear drive system of claim 11, wherein the receiving portion further defines a cutout communicated with the receiving space, and the pressing arm is configured to extend in the receiving space via the cutout to press the elastic element.

13. The gear drive system of claim 10, wherein the first slave gear comprises a first gear portion and a second gear portion with the same axis as the first gear portion; the first gear portion engages the drive gear; and the second gear portion engages the third slave gear.

14. The gear drive system of claim 10, wherein a cross section of the rotating shaft is eye-shaped.

15. The gear drive system of claim 14, wherein the rotating hole is circular.

16. The gear drive system of claim 10, wherein the elastic element is configured to rebound to drive the second slave gear to move to an original position when the drive gear moves on the rack.

\* \* \* \* \*